CHESTER PALMER, OF WILLOUGHBY, OHIO.

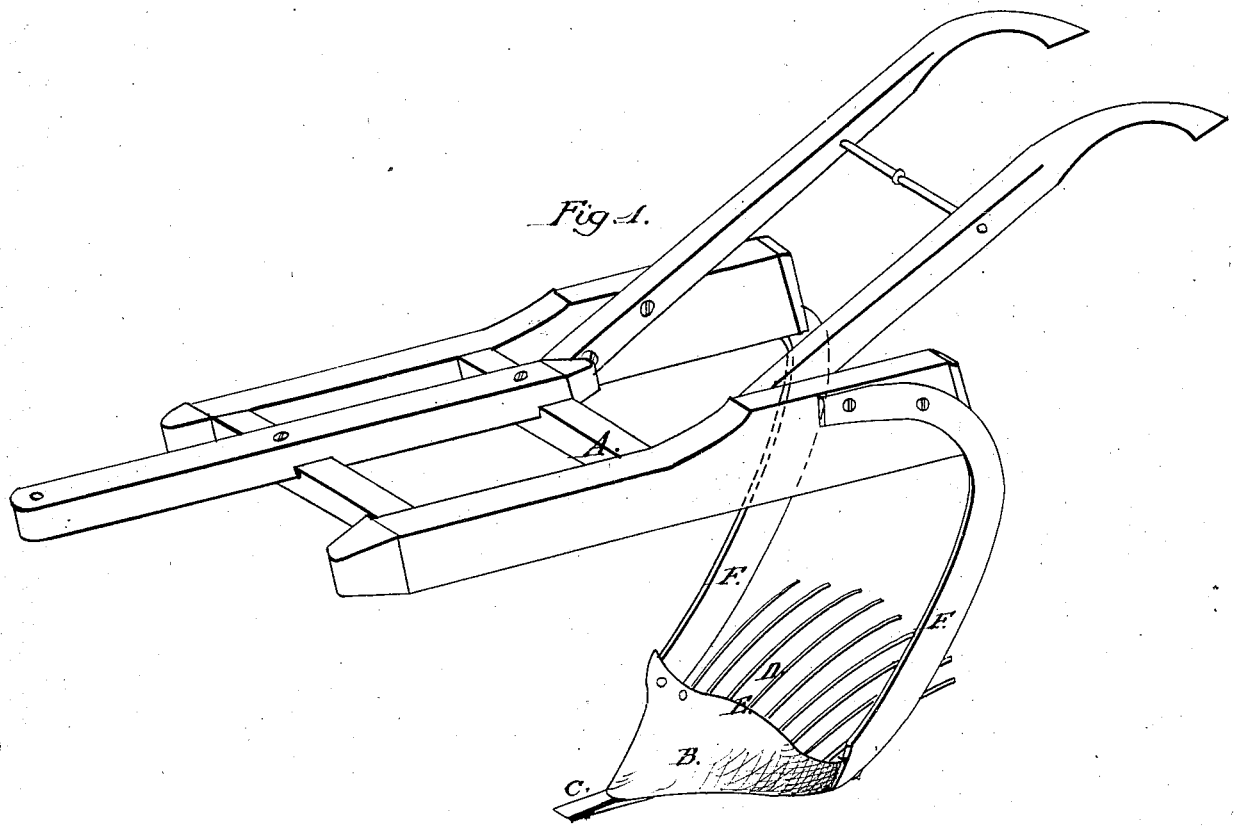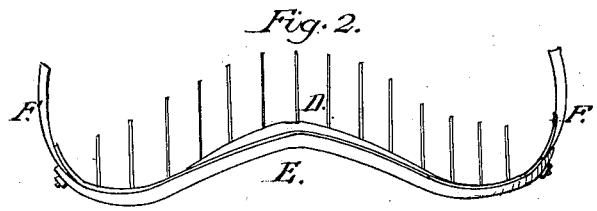

*Letters Patent No. 88,199, dated March 23, 1869.*

IMPROVEMENT IN POTATO-DIGGER.

The Schedule referred to in these Letters Patent and making part of the same.

*To all whom it may concern:*

Be it known that I, CHESTER PALMER, of Willoughby, in the county of Lake, and in the State of Ohio, have invented a new and useful Improvement in Potato-Diggers; and do hereby declare that the following is a full, clear, and exact description thereof, reference being had to the accompanying drawing, making a part of this specification, in which—

Figure 1 is a diagonal side perspective view of the machine.

Figure 2 is a view of the rear end of the share, with the separator attached.

To a frame-work, A, composed of side-pieces of wood, two or three inches thick, by three to five inches high, and about four or five feet long, are fastened handles, like those to plows, to the inside of the rear ends of said side-pieces.

These side-pieces are connected, at a distance apart of from two to three feet, by wooden cross-bars, and have fastened, upon the centre of these cross-bars, a beam, to which the hauling-gear is attached.

Beneath the rear part of this frame A, and about two feet from it, a share, B, is attached, by curved iron arms, F F, fastened to the outside rear ends of the side-pieces of the frame, and riveted to the outside rear corners of the share.

These iron arms may be made of bars, three or four inches wide, and half an inch thick.

These arms have a large curve to the rear, where they are fastened upon the side-pieces, for the purpose of giving a long bearing upon the wood, and another curve laterally outward, and then inward, so as to coincide with the curved wings of the share, where it is joined to them.

The share B, from two to three feet wide, has a general triangular form, with an obtuse angle at its front, and acute angles at the wings, and may be made of light boiler-iron.

This share has an upward curve in the centre, and downward curves between the centre and the wings, and the wings are turned up in a curve, as high as the top of the centre.

To the under side of the front angle of the share a flat, wedge-shaped iron or steel-point, C, is riveted.

To the rear of the share, upon the under side, a narrow, thin plate of iron, E, is fastened by screws, in which plate are inserted eight to twelve tines, equidistant, from eighteen to twenty-four inches long.

These tines D may be made of half-inch iron rods, and have a general upward curve, in a line with the direction of that part of the share to which they are severally attached, and bending down irregularly toward their points.

When in use, and attached to a team, this machine is placed in a potato-row, without the separator, when the vines are green and fast to the tubers. The point of the share enters the earth, just below the potatoes, and raises the whole hill quite rapidly in the centre, where the share rises in a curve, loosening every portion of the earth so raised, and depositing it, after the share has passed under it by the contracting curves of the wings, so that the hill is flattened, the vines are left upright, with the potatoes fast to them, quite near to the surface, by the earth, about and above them, thoroughly loosened and pulverized, so that the laborer, who follows after, may grasp all the vines of each hill with his hands, and readily draw them up, with the tubers, and shake them off upon the ground, or into a vessel.

When the vines are dead, and not fast to the potatoes, the separator is attached to the share, and, in that case, the earth falls between the tines, after the share passes under the hill, and the tubers and vines pass over the tines, and fall loosely upon the ground.

This machine may be constructed by almost any farmer, with the assistance of a common blacksmith, at a cost of fifteen dollars; and has proved, upon actual trial, to be capable of raising, and preparing for gathering, two hundred bushels of potatoes per hour, leaving the earth friable, and saving one plowing.

The machine is very light, and, by its peculiar form of share, very easy of draught, readily managed, not liable to get out of order, cheaply and quickly repaired, and so effective as to save more than one-half of the ordinary labor of digging by hand.

What I claim as my invention, and desire to secure by Letters Patent, is—

1. In combination with the share B, the detachable separator E D, substantially as described, and for the purposes set forth.

2. Also, the arrangement and combination of the share B and separator E D, with the frame A, substantially as described, and for the purposes set forth.

In testimony that I claim the foregoing, I have hereunto set my hand, this 11th day of February, 1869.

CHESTER PALMER.

Witnesses:
O. H. SHARPE,
A. B. PAYN.